United States Patent [19]

Zuraski et al.

[11] Patent Number: 4,871,040
[45] Date of Patent: Oct. 3, 1989

[54] ELECTROMAGNETIC CONTROL APPARATUS FOR VARYING THE DRIVER STEERING EFFORT OF A HYDRAULIC POWER STEERING SYSTEM

[75] Inventors: Jeffery A. Zuraski, Saginaw; Andrzej M. Pawlak, Troy; David W. Graber, Millington; James W. Babineau, Saginaw, all of Mich.

[73] Assignee: General Motors Corporation, Detroit, Mich.

[21] Appl. No.: 314,249

[22] Filed: Feb. 23, 1989

Related U.S. Application Data

[63] Continuation of Ser. No. 211,738, Jun. 27, 1988, abandoned.

[51] Int. Cl.$^4$ ............................................. B62D 5/04
[52] U.S. Cl. .................................. 180/142; 180/143; 180/79.1
[58] Field of Search ............... 180/141, 142, 143, 79.1, 180/147

[56] References Cited

U.S. PATENT DOCUMENTS 4,629,025  12/1986  Braiser et al.
4,765,427  8/1988  Yonker ................................ 180/143
4,778,021  10/1988  Morishita et al. ................... 180/79.1
4,783,626  11/1988  Shimizu ............................... 180/79.1

Primary Examiner—Charles A. Marmor
Assistant Examiner—Richard Camby
Attorney, Agent, or Firm—Mark A. Navarre

[57] ABSTRACT

A hydraulic power steering system having conventional relatively rotatable spool and valve body elements for flow regulation, and an integral electromagnetic mechanism which effectively varies the centering force between the spool and valve body to adjust the level of steering assist provided for a given operator steering input. The electromagnetic mechanism includes a rotary magnetic circuit and a stationary magnetic circuit. The rotary magnetic circuit comprises a pair of axially displaced magnetic pole pieces which rotate with the pinion shaft and a permanent magnet disk element which is disposed between the pole pieces and which rotates with the input shaft. The stationary magnetic circuit includes an annular exciting coil disposed about the rotary magnetic circuit and ferromagnetic pole elements adjacent each of the rotary pole pieces. The exciting coil is energized so as to vary the valve body/spool centering force, and hence the driver steering effort, with vehicle speed.

15 Claims, 4 Drawing Sheets

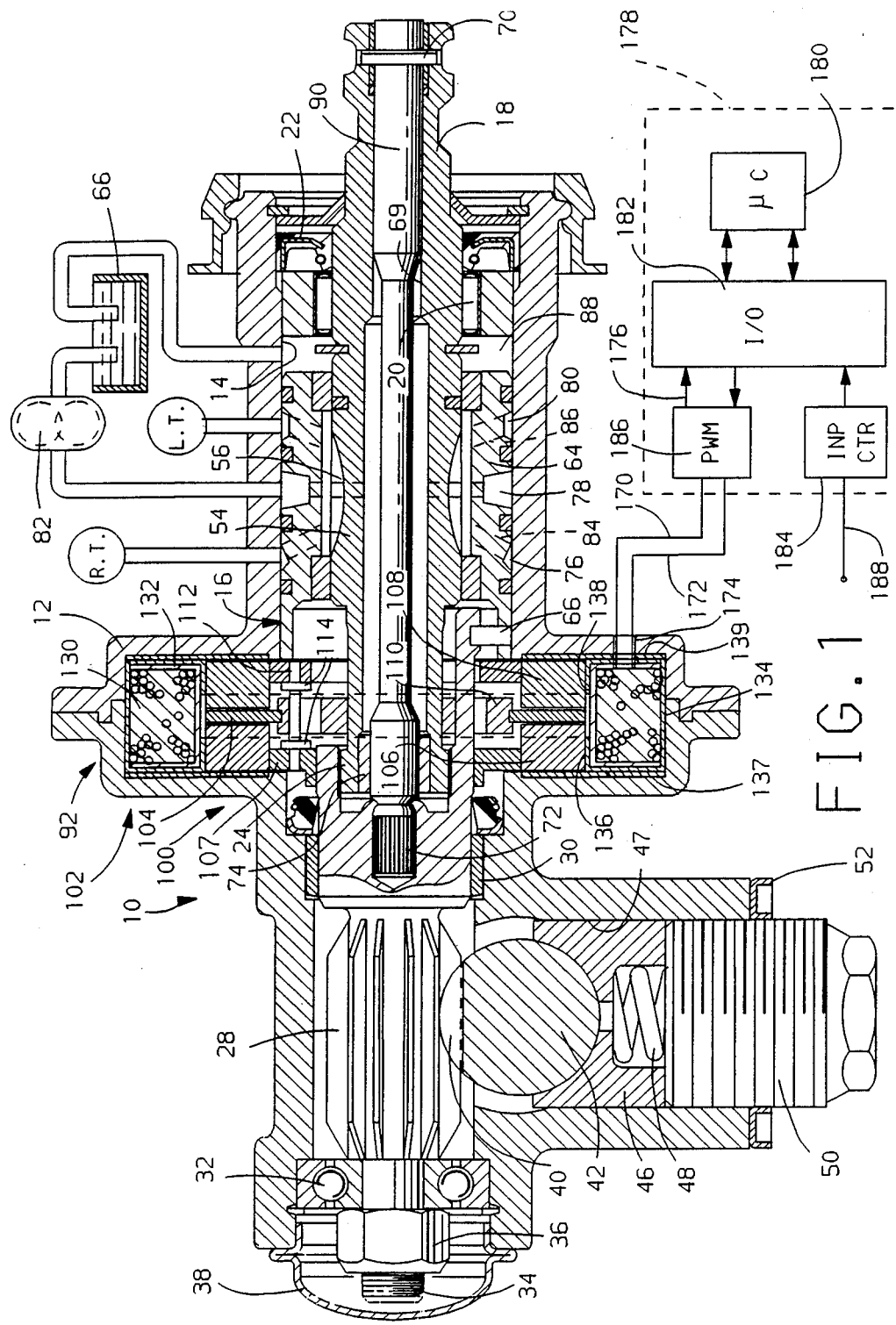

0
ELECTROMAGNETIC CONTROL APPARATUS FOR VARYING THE DRIVER STEERING EFFORT OF A HYDRAULIC POWER STEERING SYSTEM

This is a continuation of application Ser. No. 211,738, filed 6/27/88, now abandoned.

This invention relates to an automotive hydraulic power assist steering system, and more particularly to an electromagnetic control apparatus for varying the driver steering effort required to produce a given level of power assist.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool, and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body and to permit relative rotation therebetween in relation to operator exerted steering torque, at least within the limitations of the lost motion coupling.

In systems of the type described above, the level of driver steering effort assist required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

To overcome the engineering trade-off described above, various arrangements have been proposed for varying the driver steering effort for a given level of power assist as a function of vehicle speed. An example of one such arrangement is given in U.S. Pat. No. 4,629,025, issued to Brasier et al. Dec. 16, 1986, and assigned to the assignee f the present invention. In that arrangement, a controlled portion of the hydraulic fluid pump output is returned to the reservoir of the pump to reduce fluid flow to the steering actuator with increasing vehicle speed.

SUMMARY OF THE PRESENT INVENTION

The present invention is directed to a hydraulic power assist steering system having conventional relatively rotatable spool and valve body elements for flow regulation, and an integral electromagnetic mechanism which defines a coupling of variable resilience between the spool and valve body for adjusting driver steering effort required to produce a given level of power assist.

The integral electromagnetic mechanism of this invention includes a rotary magnetic circuit and a stationary electromagnetic circuit. The rotary magnetic circuit comprises a pair of relatively rotatable elements, one of which is toothed to conduct magnetic flux and one of which includes permanent magnets for establishing a permanent magnet coupling.

In the illustrated embodiment, the toothed element is defined by a pair of axially displaced magnetic pole pieces and the permanent magnet element is defined by a disk element disposed between the magnetic pole pieces. The disk element is supported for rotation with the input (operator driven) steering shaft and the pole pieces are supported for rotation with the output (pinion) steering shaft. The disk element is axially magnetized to define an even number N of radially extending, alternating magnetic polarity sectors. The rotary pole pieces each have N/2 teeth extending toward the respective axial face of the disk element. The stationary electromagnetic circuit comprises at least one annular exciting coil disposed about the rotary magnetic circuit and ferromagnetic pole elements positioned adjacent the rotary magnetic pole pieces.

The above elements define two magnetic flux paths: a permanent magnet flux path which includes (neglecting leakage flux) only the rotary magnetic circuit elements, and an electromagnetic flux path which includes both the stationary and rotary magnetic circuit elements. The rotary pole pieces and the disk element are oriented such that (1) when the assembly is in the centered position, both flux paths are magnetically balanced, and (2) when there is relative rotation of the input and output steering shafts, the flux in the two paths develop in-phase centering forces which tend to restore the assembly to the centered position. The force due to the electromagnetic flux path is variable over a wide range depending on the magnitude and direction of current supplied to the coil, and such current may be scheduled in relation to the vehicle speed to provide a speed-dependent relationship between the operator input torque and the power assist torque.

In the illustrated embodiment, the mechanism of this invention is used in combination with a conventional torsion bar to define a variable resiliency coupling between the hydraulic fluid supply elements. The combination of the torsion bar and the permanent magnet flux path provide a coupling of intermediate resilience to generate an intermediate level of steering assist for a given driver steering input. Variably energizing the exciting coil with current of one polarity variably increases the resilience of the coupling so that more driver steering effort is required to produce a given level of power assist. Variably energizing the exciting coil with current of the opposite polarity variably decreases the resilience of the coupling so that less driver steering effort is required to produce a given level of power assist. Preferably, the coil energization is scheduled in relation to the speed of the vehicle so that the level of steering assist decreases with increasing vehicle speed. A driver preference input may also be used.

BRIEF DESCRIPTION OF THE DRAWINGS

FIG. 1 is a sectional view of a hydraulic control valve assembly incorporating the integral electromagnetic mechanism of this invention, and a block diagram of a computer-based controller therefor.

DESCRIPTION OF THE PREFERRED EMBODIMENT

Figure 2A:
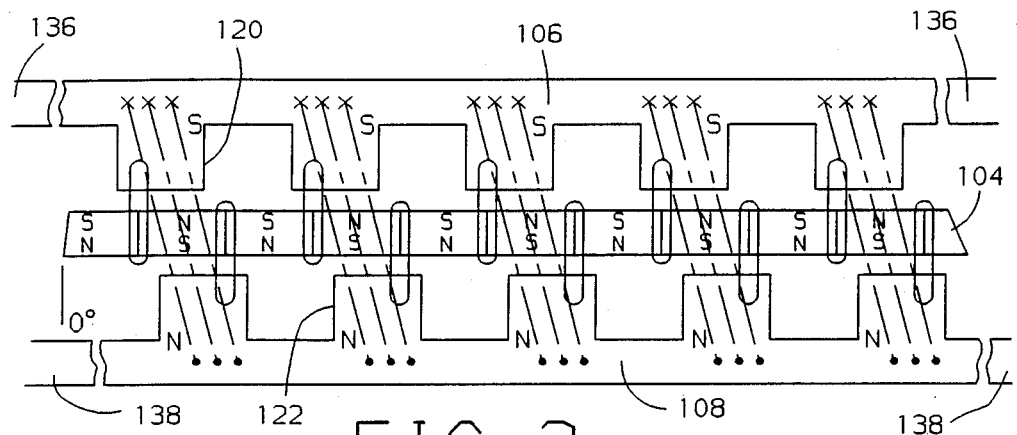
FIGS. 2a, 2b and 2c schematically depict a linearized view of the rotary magnetic circuit of the electromagnetic mechanism shown in FIG. 1.

Referring to FIG. 1, the reference numeral 10 generally designates a portion of a motor vehicle hydraulic power assist rack and pinion steering gear. The steering gear 10 is disposed within a two-piece housing 12 having a cylindrical smooth wall bore 14 formed therein. A cylindrical rotary power steering gear valve assembly 16 disposed within the bore 14 includes an elongated cylindrical spool shaft 18 mounted for turning movement in the housing 12 by a bearing assembly 20. The inboard end of spool shaft 18 projects through an annular fluid seal 22 for connection to a conventional steering shaft and operator manipulated handwheel, not shown.

The outboard end of the spool shaft 18 is splined as indicated by the reference numeral 24 with an elongated pinion gear 28 to define a lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn chambers of the power cylinder to apply right-hand or left-hand steering assist force to rack 42. A power cylinder meeting the above description is described in detail in U.S. Pat. No. 4,454,801 to Spann, issued June 19, 1984, and assigned to the assignee of the present invention, such patent being incorporated herein by reference.

Close meshing engagement between the teeth of the pinion 28 and the rack 42 is achieved by the rack contact shoe 46 which is slidably mounted in the housing bore 47. A helical spring 48 seated between the contact shoe 46 and an adjusting plug 50, tensions the contact shoe 46. Plug 50 is threaded into the end of housing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve assembly 16 also includes a cylindrical valve body 64 rotatably mounted within valve bore 14 on the valve spool 54. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78, and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator) as indicated for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Together, the torsion bar 90 and electromagnetic mechanism 92 permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 and electromagnetic mechanism 92 center the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28. Bearing sleeve 74 supports the inner end of the spool shaft 18 on a cylindrical portion of the torsion bar 90.

The electromagnetic mechanism 92 comprises a rotary magnetic circuit and a stationary magnetic circuit, generally designated by the reference numerals 100 and 102, respectively.

The stationary electromagnetic circuit 102 comprises an annular exciting coil 130 wound around the rotary magnetic circuit 100 on a bobbin 132 and a partially encircling ferromagnetic pole element 134. The pole surfaces 136–139 of pole element 134 are positioned in close proximity to the rotary magnetic circuit 100 to facilitate both radial and axial transfer of magnetic flux between the stationary and rotary magnetic circuits 102, 100. The lead ends 170, 172 of coil 130 pass through a suitable opening 174 in the housing 12 and are connected to the computer-based control unit 178, described below.

The rotary magnetic circuit 100 comprises a permanent magnet disk element 104 and a pair of rotary ferromagnetic pole pieces 106, 108. The disk element 104 is secured to a rotor hub 110, which is secured onto the outboard end of spool shaft 18 for rotation therewith. The pole piece 106 is secured onto the inboard end of pinion 28 for rotation therewith via a nonmagnetic spacer 107. A plurality of pins 112 secured into openings in the pole pieces 106, 108 serve to rigidly fasten the pole piece 108 to the pole piece 106, and to establish a predetermined angular alignment therebetween as explained below.

A pair of flanges 114 on each pin 112 seat against the pole pieces 106, 108 to establish a predetermined clearance which is somewhat greater that the axial dimension of the disk element 104. The disk element 104 is positioned approximately midway between the pole pieces 106, 108 at the time of assembly.

Figure 2B:
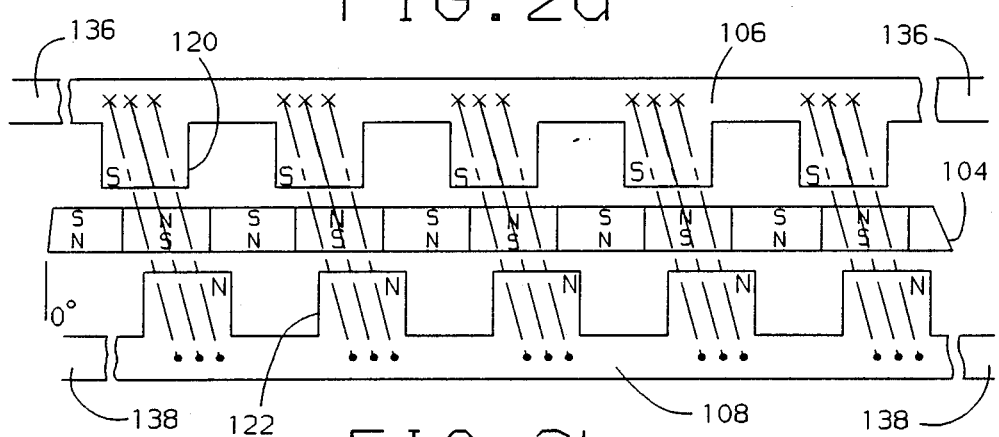
Figure 2C:
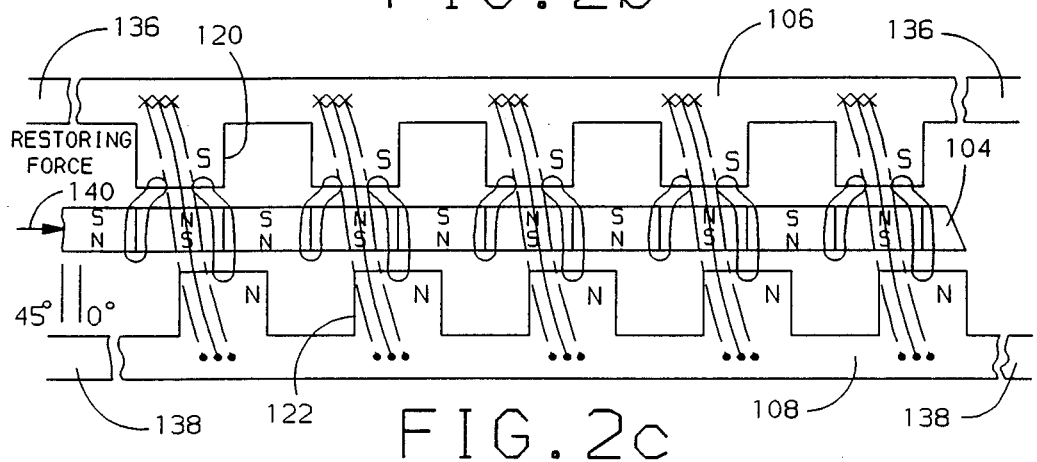

As seen more clearly in the linearized representation of FIGS. 2a–2c, the permanent magnet disk element 104 is axially magnetized to define an even number N of radially extending, alternating magnetic polarity sectors, and the pole pieces 106, 108 each have N/2 homopolar teeth 120, 122 extending toward the axial faces of the disk element 104. The teeth 120, 122 are angularly offset by approximately ¼ pole pitch, and the disk element 104 is oriented such that its magnetic sectors are offset from like polarity teeth of the rotary pole pieces 106, 108 by ⅛ pole pitch when the valve spool 54 and valve body 64 are centered.

As shown in FIGS. 2a–2c, the above elements define two magnetic flux paths: a permanent magnet flux path which includes only the rotary magnetic circuit elements 104, 106, 108, and an electromagnetic flux path which includes both the stationary and rotary magnetic circuit elements 104, 106, 108 and 134, and the pole pieces 136–139.

Referring to FIGS. 2a and 2c, magnetic flux flowing in the permanent magnet flux path is produced solely by the permanent magnets of disk element 104. Such flux exists independent of the stationary pole element 134. When the valve spool 54 and valve body 64 are centered, as in FIG. 2a, no magnetic centering force (torque) is produced. When there is a relative displacement of the valve spool 54 and valve body 64, as in FIG. 2c, the magnetic forces generated by the flux in the permanent magnet flux path become imbalanced and develop a resultant restoring (centering) force in the direction of the arrow 140, with or without energization of the exciting coil 130. Such force varies as a function of relative displacement, as graphically represented by the idealized trace 144 in FIG. 3.

Referring to FIGS. 2b and 2c, and ignoring the effect of the permanent magnets, magnetic flux flowing in the electromagnetic flux path is produced primarily by energization of the stationary magnetic circuit exciting coil 130. As indicated by the broken lines, such flux enters the rotary pole piece 108 (NORTH) via the stationary pole pieces 138 and 139, and exits the rotary pole piece 106 via the stationary pole pieces 136 and 137. When the valve spool 54 and valve body 64 are centered, as in FIG. 2b, no magnetic centering force is developed. When there is a relative displacement of the valve spool 54 and valve body 64, as in FIG. 2c, the magnetic forces generated by the flux in the electromagnetic flux path become imbalanced and develop a resultant restoring (centering force in the direction of the arrow 140. Such force varies as a function of coil energization and relative displacement, the force for a given coil current magnitude being depicted as a function of relative displacement by the idealized traces 142 and 142' in FIG. 3.

Figure 3:
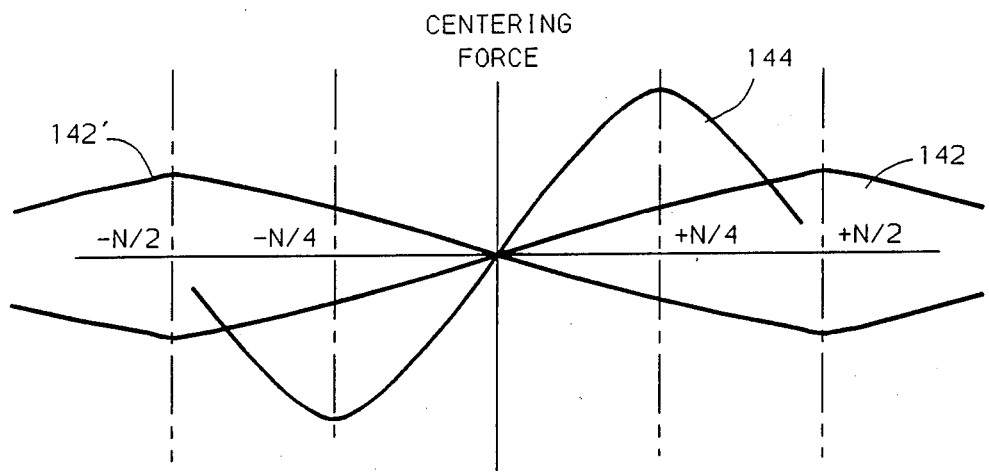
FIG. 3 depicts the centering forces generated by the electromagnetic mechanism of FIG. 1 as a function of steering shaft rotation for a given vehicle speed.

The electromagnetic centering force represented by the trace 142 in FIG. 3 is produced by energizing the exciting coil 130 with a given current of a first polarity. Such force is additive to the permanent magnet centering force (trace 144), at least for relative displacements of ±N/4 electrical degrees (4.5 mechanical degrees in the illustrated embodiment) or less, where N is the number of magnetic sectors in the rotary disk element 104. The electromagnetic centering force represented by the trace 142' in FIG. 3 is produced by energizing the exciting coil 130 with current of the same magnitude, but of opposite polarity. Such force is subtractive to the permanent magnet centering force, at least for relative displacements of ±N/4 electrical degrees or less.

The effective resiliency of the coupling between valve spool 54 and valve body 64 is determined by the sum of the centering forces of the torsion bar 90, the permanent magnet flux path, and the electromagnetic flux path. The combined centering force is depicted as a function of relative displacement in FIG. 4. The torsion bar and permanent magnet flux path forces are fixed for a given installation, but the electromagnetic flux path force is variable with the exciting coil energization current magnitude and direction, and results in the family of curves depicted in FIG. 4, and described below.

The computer-based control unit 178 of FIG. 1 is supplied with operating power from the vehicle storage battery (not shown), and comprises a microcomputer (uC) 180, an input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 130. Program instructions are described below in reference to the flow diagram of FIG. 5.

The primary control unit input is an oscillatory vehicle speed signal on line 188, which may be obtained from a conventional speed pickup, not shown. The speed signal is applied to the I/O device 182 through the input counter 184, which divides the frequency of the speed signal by a predetermined factor. The PWM command for exciting coil 130 is applied to a bidirectional PWM driver 186 (which may take the form of a conventional H-switch driver) for correspondingly modulating the coil 130 with current from the vehicle storage battery, not shown. A signal indicative of the coil current is developed by the PWM driver 186 on line 176 with a suitable current shunt, such signal being applied as an input to an analog port of the I/O device 182 for use in a closed-loop control of the coil current. Open-loop voltage control may alternately be employed, if desired.

Figure 4:
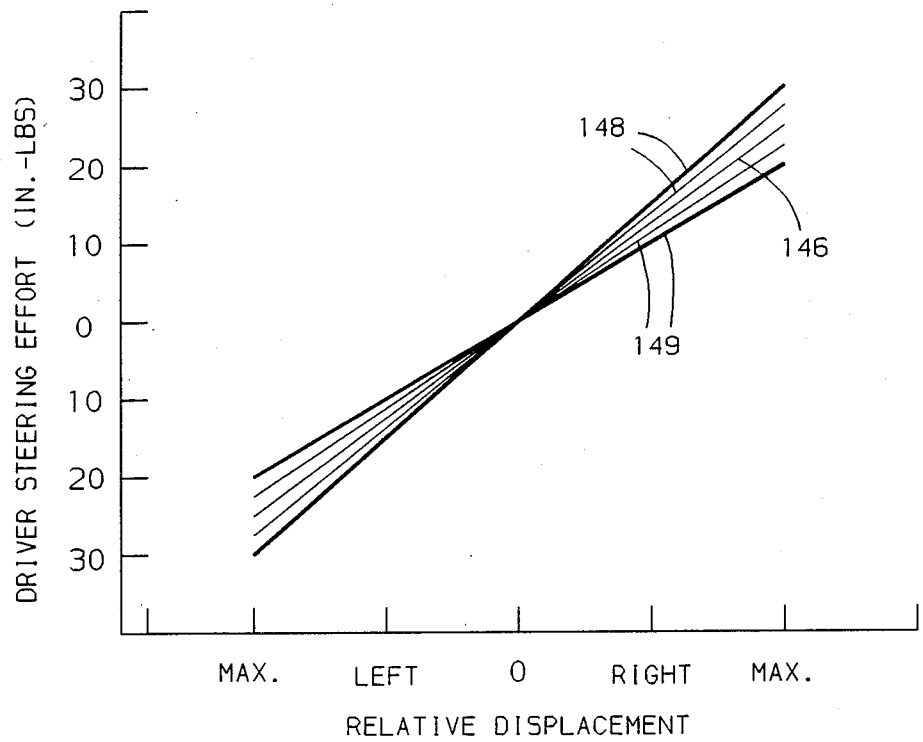
FIG. 4 depicts the variation in driver steering effort achieved by the control valve and controller of FIG. 1 for various vehicle speeds.

According to the illustrated embodiment, the combined effect of the torsion bar 90 and the permanent magnet flux path centering forces produce an intermediate level of steering assist, represented by the trace 146 in FIG. 4. This level of assist is most suitable for an intermediate vehicle speed such as 30 miles per hour. With increasing vehicle speed, the control unit 178 begins energizing the exciting coil 130 with progressively increasing levels of a first polarity current to increase the driver steering effort per unit relative displacement of the valve spool 54 and valve body 64, as indicated by the traces 148. With decreasing vehicle speed, the control unit 178 begins energizing the exciting coil 130 with progressively increasing levels of the opposite polarity current to reduce the driver steering effort per unit relative displacement of the valve spool 54 and valve body 64, as indicated by the traces 149. This produces a variable effort effect since the level of power assist is directly related to the relative displacement of the valve spool 54 and valve body 64.

The maximum relative displacement limits (MAX) are defined by the splined lost motion coupling between spool shaft 18 and pinion gear 28. Once the maximum displacement has occurred, further rotation of the steering wheel is mechanically transmitted to the pinion gear 28 via the coupling. In the illustrated embodiment, the coupling permits relative displacements of approximately ±4.5 mechanical degrees (N/4 electrical degrees), the region over which the combination of the permanent magnet and electromagnetic centering forces is linear or quasi-linear.

It should be recognized, of course, that alternative control methods may be employed. For example, the torsion bar 90 could be designed so that the combination of its centering force and the permanent magnet flux centering force provides an extreme level of steering assist. In this event, the control unit 178 could effect unidirectional current control of the exciting coil 130 to adjust the overall resilience of the valve body/spool coupling. In such case, the bidirectional PWM driver 186 could be replaced with a unidirectional driver.

As a further control alternative, the torsion bar 90 could be dispensed with completely. In such an arrangement, the base level (that is, no coil current) of steering assist would be determined solely by the centering force produced by the flux of the permanent magnet flux path. As with the other embodiments, such centering force could be varied through energization of the exciting coil 130 with either unidirectional or bidirectional current.

Figure 5:
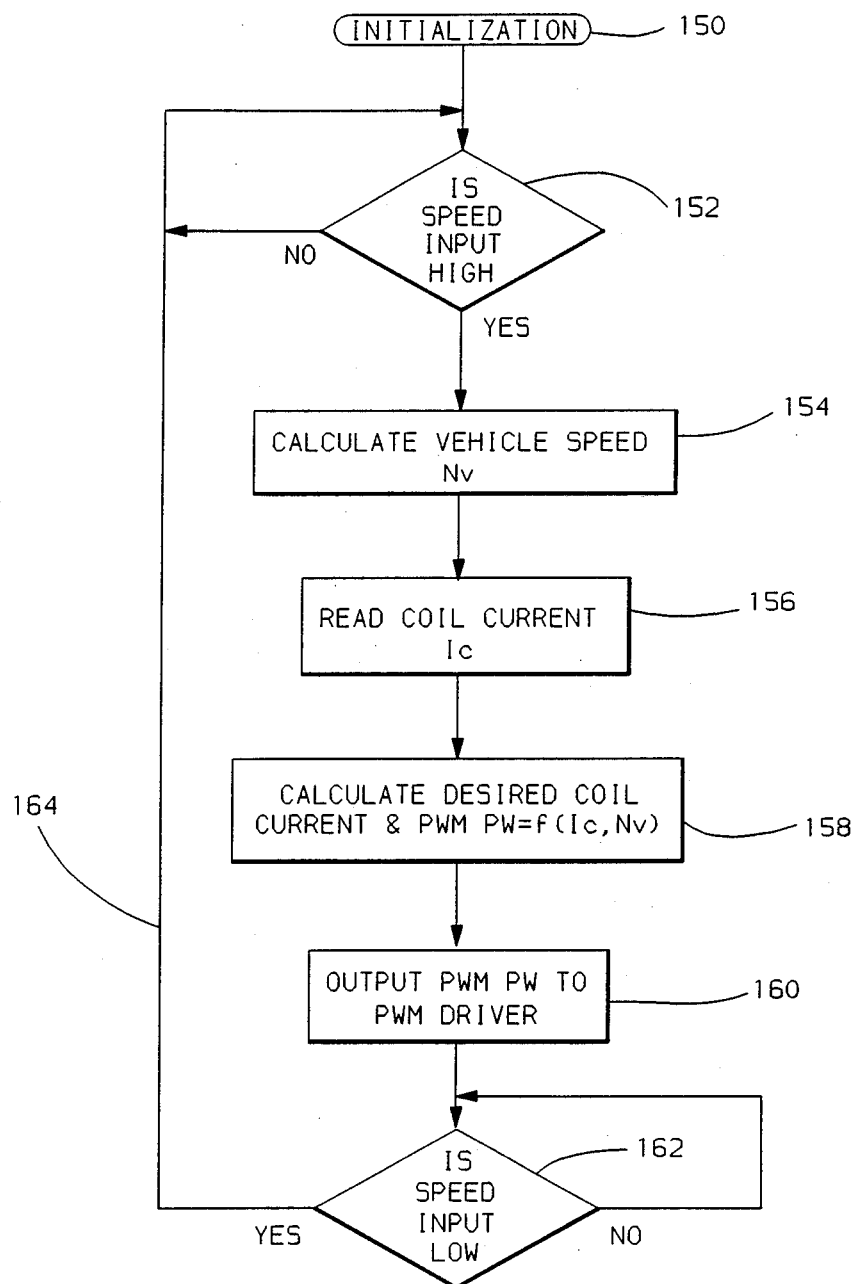
FIG. 5 is a flow diagram representative of computer program instructions executed by the computer based controller of FIG. 1 in controlling the excitation of the electromagnetic mechanism of this invention.

Regardless of the control method employed, FIG. 5 depicts a simplified flow diagram representative of computer program instructions which would be executed by the computer-based control unit 178 of FIG. 1 in carrying out the control. The block 150 designates a series of program instructions executed at the initiation of each period of vehicle operation for initializing the various registers and program variable to predetermined values. Thereafter, the blocks 152–162 are executed as explained below.

The decision blocks 152 and 162 detect a low to high transition of the vehicle speed signal output of input counter 184. When the transition is detected, the instruction blocks 154, 156, 158 and 160 are sequentially executed to calculate the vehicle speed $N_v$, to read the coil current value $I_c$, and to calculate and output a PWM pulse width to the PWM driver 186. Calculation of the vehicle speed at block 154 is based on the elapsed time between low-to-high transitions of the input counter carry bit, such time being inversely proportional to vehicle speed $N_v$. Calculation of the PWM pulse width command is based on the deviation of the desired coil current from the measured coil current $I_c$, the desired current being determined in accordance with vehicle speed, as indicated in FIG. 4.

While this invention has been described in reference to the illustrated embodiment, various modifications will occur to those skilled in the art. In essential form, the control apparatus of this invention comprises a stationary magnetic circuit and a rotary magnetic circuit including at least two relatively rotatable elements. The function of the magnetic circuits can be achieved with alternate (such as cylindrical) configurations, and it should be understood that the scope of this invention is defined solely by the appended claims. Moreover, various control parameters, such as driver preference (light, medium, or heavy effort) or pressure feedback may be used, either separately or in combination with the above-described vehicle speed parameter.

The embodiments of the invention in which an exclusive property or privilege is claimed are defined as follows:

1. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for varying the driver steering effort required to produce a given power assist steering force, the apparatus comprising:
  rotary magnetic circuit means including a permanent magnet element connected for rotation with one of said pair of hydraulic elements, and a rotary magnetic flux conducting element connected for rotation with the other of said pair of hydraulic elements such that magnetic flux developed by the permanent magnet element enters the rotary flux conducting element to develop a permanent magnet centering force which is rotationally balanced in a centered relative position of said rotary magnetic elements corresponding to a minimum flow relative position of said hydraulic elements, but which resists relative rotation therefrom; and
  stationary magnetic circuit means including an annular exciting coil disposed about the rotary magnetic circuit means and a stationary flux conducting element for completing an electromagnetic flux path between the rotary and stationary magnetic circuit means so that magnetic flux developed in the electromagnetic flux path during energization of said exciting coil produces an electromagnetic centering force which combines with the permanent magnet centering force to produce an overall centering force which is variable with the coil energization, whereby the driver steering effort required to produce a given relative rotation of said rotatable hydraulic elements, and hence a given level of power steering assist force, is variable with such coil energization.

2. The apparatus set forth in claim 1, additionally including a resilient element mechanically coupling the rotary hydraulic elements to develop a mechanical centering force which is rotationally balanced in the centered relative position of said rotary magnetic elements, but which resists relative rotation therefrom, whereby the basic resilient coupling between the hydraulic elements is defined by the combination of said permanent magnet and mechanical centering forces.

3. The apparatus set forth in claim 2, wherein the resilient element if a torsion bar.

4. The apparatus set forth in claim 1, wherein:
  the permanent magnet element of the rotary magnetic circuit means is defined by an axially magnetized permanent magnet disk;
  the flux conducting element of the rotary magnetic circuit means is defined by a pair of rotary flux conducting disks oppositely disposed about said permanent magnet disk; and the stationary flux conducting element of the stationary magnetic circuit means includes pole surfaces situated in close proximity to the rotary flux conducting disks.

5. The apparatus set forth in claim 4, wherein:
the axially magnetized permanent magnet disk has N sectors of alternating magnetic polarity; and
at least one of the rotary flux conducting elements has N/2 axially extending teeth disposed in close proximity to the axial face of the permanent magnet disk.

6. The apparatus set forth in claim 4, wherein:
the axially magnetized permanent magnet disk has N sectors of alternating magnetic polarity; and
the rotary flux conducting elements each have N/2 homopolar teeth extending toward the opposite axial faces of said permanent magnet disk.

7. The apparatus set forth in claim 6, wherein:
elements are angularly offset by approximately ¼ of a permanent pole pitch; and
the permanent magnet disk is positioned relative to the rotary flux conducting elements such that the axial faces of its permanent magnet sectors are angularly offset from like polarity teeth of said rotary flux conducting elements by approximately ¼ of a permanent magnet pole pitch when the hydraulic elements are in said minimum flow relative position.

8. A vehicular power assist steering system having a pair of relatively rotatable hydraulic elements connected between a driver manipulated steering shaft and a steering gear, the hydraulic elements being adapted to generate hydraulic steering assist flow for producing power assist steering force in relation to their relative rotation, the improvement comprising:

rotary magnetic circuit means including a permanent magnet element connected for rotation with one of said pair of hydraulic elements, and a rotary magnetic flux conducting element connected for rotation with the other of said pair of hydraulic elements such that magnetic flux developed by the permanent magnet element enters the rotary flux conducting element to develop a permanent magnet centering force which is rotationally balanced in a centered relative position of said rotary magnetic elements corresponding to a minimum flow relative position of said hydraulic elements, but which resists relative rotation therefrom to thereby define a basic resilient coupling between the hydraulic elements;

stationary magnetic circuit means including an annular exciting coil disposed about the rotary magnetic circuit means and a stationary flux conducting element disposed adjacent said rotary flux conducting element to define an electromagnetic flux path between the rotary and stationary magnetic circuit means such that magnetic flux developed in the electromagnetic flux path during energization of said exciting coil produces an electromagnetic centering force which combines with the permanent magnet centering force to produce a variable overall centering force for defining a variable resiliency coupling between the rotatable hydraulic elements; and control means for energizing the exciting coil of said stationary magnetic circuit means in relation to the travelling speed of the vehicle to thereby vary the magnitude of said overall centering force with vehicle speed.

9. The system set forth in claim 8, wherein:
the basic resilient coupling defined by the permanent magnet centering force provides an intermediate level of steering assist flow suitable for an intermediate vehicle speed; and
the control means energizes the exciting coil with current (1) of a first polarity for vehicle speeds above said intermediate speed for increasing the overall centering force to reduce the steering assist flow, and (2) of a second polarity for vehicle speeds lower than said intermediate speed for decreasing the overall centering force to increase the steering assist flow.

10. The system set forth in claim 8, wherein:
the basic resilient coupling defined by the permanent magnet centering force provides a relatively high level of steering assist force suitable for relatively low vehicle speeds; and
the control means energizes the exciting coil with current of a single polarity for vehicle speeds above said relatively low speeds for increasing the overall centering force to reduce the steering assist flow.

11. The system set forth in claim 8, wherein:
the basic resilient coupling defined by the permanent magnet centering force provides a relatively low level of steering assist force suitable for relatively high vehicle speeds; and
the control means energizes the exciting coil with current of a single polarity for vehicle speeds lower than said relatively high speeds for decreasing the overall centering force to increase the steering assist flow.

12. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for defining a resilient rotational coupling between said hydraulic elements, comprising:

rotary magnetic circuit means including a first magnetic element connected for rotation with one of said pair of hydraulic elements, and a second magnetic element connected for rotation with the other of said pair of hydraulic elements, the first and second magnetic elements being magnetically coupled for developing a magnetic rotational coupling between said hydraulic elements that resists relative rotation of said hydraulic elements form a centered relative position of minimum power assist steering force.

13. The apparatus set forth in claim 12, including an energized coil magnetically coupled to one of the first and second magnetic elements for controlling the strength of said magnetic rotational coupling.

14. In a vehicular power assist steering system wherein a pair of relatively rotatable hydraulic elements are connected between a driver manipulated steering shaft and a steering gear, the hydraulic elements being adapted to generate hydraulic flow for producing power assist steering force in relation to their relative rotation such that driver steering effort applied to the steering shaft produces a corresponding level of power assist steering force, apparatus for defining a resilient rotational coupling between said hydraulic elements, comprising:

rotary mechanical means including a resilient element mechanically coupling the rotary hydraulic elements for developing a mechanical rotational coupling between said hydraulic elements that resists relative rotation of such hydraulic elements from a centered relative position of minimum power assist steering force; and rotary magnetic circuit means including a first magnetic element connected for rotation with one of said pair of hydraulic elements, and a second magnetic element connected for rotation with the other of said pair of hydraulic elements, the first and second magnetic elements being magnetically coupled for developing a magnetic rotational coupling between said hydraulic elements that, together with the mechanical rotational coupling, defines the strength of the overall rotational coupling between said hydraulic elements.

15. The apparatus set forth in claim 14, including an energized coil magnetically coupled to one of the first and second magnetic elements such that the strength and direction of said magnetic rotational coupling depends on the magnitude and direction of the coil energization.

* * * * *